Figure 1:
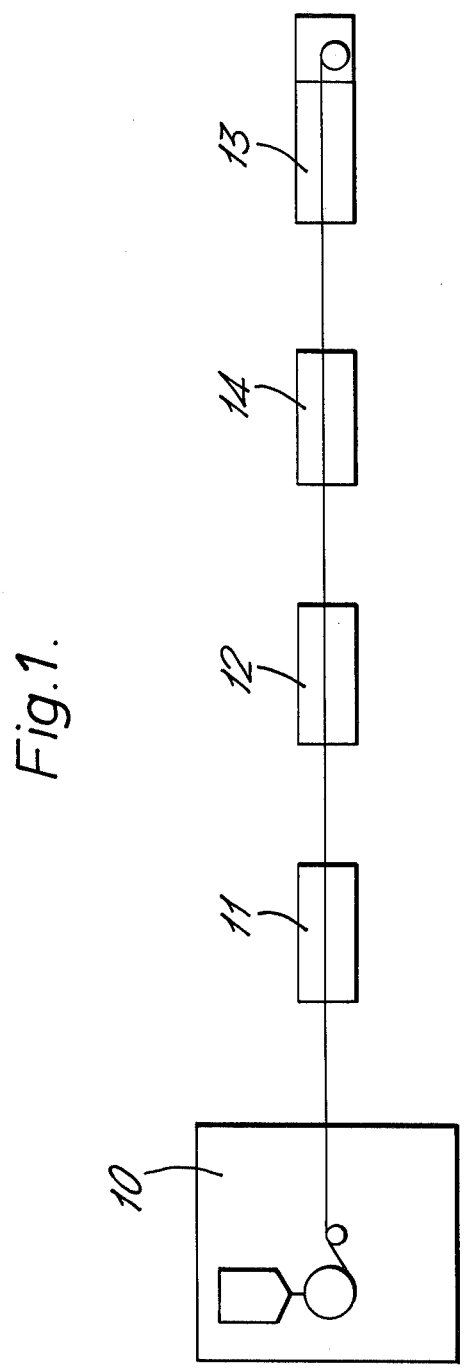

United States Patent [19]

Benson et al.

[11] 4,038,121

[45] July 26, 1977

[54] PRODUCTION OF THERMOPLASTIC FILMS

[75] Inventors: Nigel Colin Benson; John Dorab Mehta, both of Welwyn Garden City, England

[73] Assignee: Imperial Chemical Industries Limited, London, England

[21] Appl. No.: 622,160

[22] Filed: Oct. 14, 1975

[30] Foreign Application Priority Data

Oct. 24, 1974 United Kingdom ............... 46012/74
Jan. 10, 1975 United Kingdom ................ 1112/75

[51] Int. Cl.² .................... B31F 5/00; B65H 69/06
[52] U.S. Cl. ................................. 156/157; 156/244; 156/250; 264/210 R
[58] Field of Search ............... 156/157, 159, 250, 504, 156/509, 502, 244; 242/57, 58.4, 58.5; 226/109, 110; 264/210 R

[56] References Cited

U.S. PATENT DOCUMENTS

| | | | |
|---|---|---|---|
| 3,733,230 | 5/1973 | Prittie | 156/159 |
| 3,749,622 | 7/1973 | Sato et al. | 156/152 |
| 3,854,357 | 12/1974 | Kron | 156/159 |
| 3,896,820 | 7/1975 | Ludszeweit et al. | 156/504 |
| 3,925,131 | 12/1975 | Krause | 156/159 |

FOREIGN PATENT DOCUMENTS 1,338,440 11/1973 United Kingdom

Primary Examiner—William A. Powell
Assistant Examiner—Basil J. Lewris
Attorney, Agent, or Firm—Cushman, Darby & Cushman

[57] ABSTRACT

The invention is a method of automatically threading the wind-up section while the formation section runs at full speed. The stopped wind-up section is threaded with a leader while the formation section runs at full speed. The wind-up section is started. When speeds match the two webs are spliced, the leader is fed from its feed and the production web from waste so that the leader draws the production web through the wind-up section. The splicer may also act as an automatic dump.

5 Claims, 9 Drawing Figures

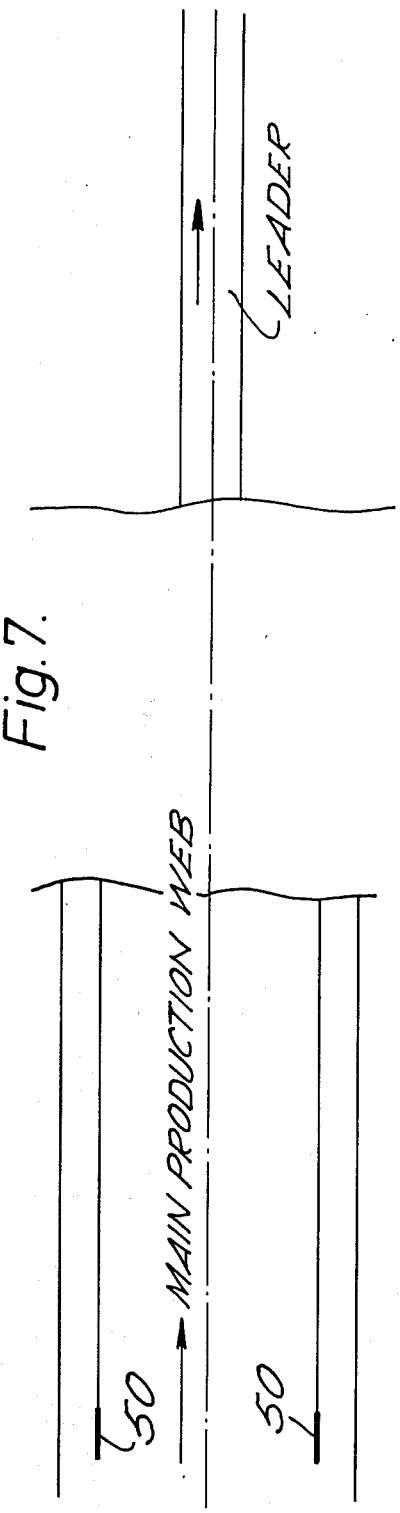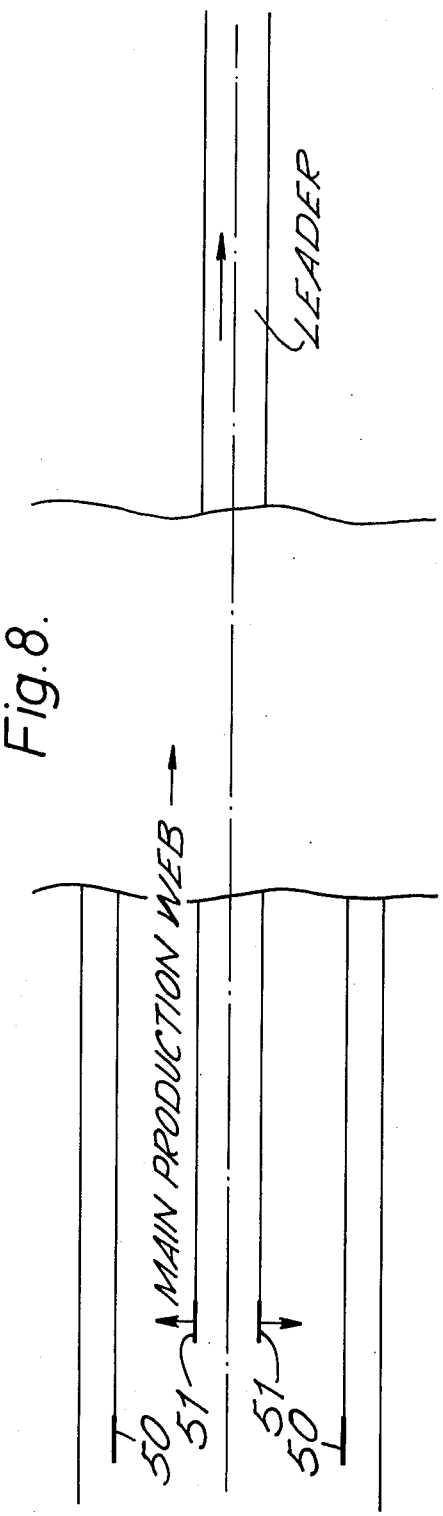

PRODUCTION OF THERMOPLASTIC FILMS

This invention relates to the production of thermoplastic films and in particular to threading the wind-up section of a production line.

The production line used to make thermoplastic film conventionally includes a formation section and a wind-up section. In the formation section the polymer is extruded and the film is formed; for poly(ethylene terephthalate) the formation section usually comprises extrusion onto a casting drum, biaxial orientation and heat setting. In the wind-up section the finished film is wound onto reels for despatch. The wind-up section usually comprises a series of rollers for maintaining a suitable tension in the film, a profile gauge and a turret for holding the reel of film being wound and for presenting an empty core to the winding station when the reel being wound is full.

Occasional faults occur in the production web, e.g. it may tear, with the result that either the web comes out of the wind-up section or it has to be removed from the wind-up section. In order to correct the fault, e.g. re-establish an untorn web, it is desirable to run the formation section at normal line speed, e.g. 300 m/min in a fast contempory line or even 600 m/min for lines at present under consideration. It is therefore desirable to thread film moving at these speeds through the wind-up section.

This is difficult especially since the film follows a complicated path through the wind-up section.

According to the invention a thermoplastic film issuing from the formation section of a production line is threaded through the wind-up section by:

a. running the formation section and feeding the production web to waste while simultaneously threading a leader through the wind-up section,
b. starting the wind-up section and matching its speed to that of the formation section, and
c. joining the leader to the production web so that the production web is threaded through the wind-up section by the leader.

Preferably stage (c) is carried out in the following order:

i. joining the leader of the production web,
ii. severing the production web from waste and severing the leader from its feed.

Most suitably the leader is severed from its feed after the production web is threaded through the whole of the wind-up section.

In a preferred method according to the invention, the leader is less than 50% of the width of the production web and said leader is attached to a strip cut from the production web. The minimum width of the leader is that giving the smallest acceptable strength during threading (and the adhesion between the leader and the strip of production web is an important item in assessing the strength). For most circumstances leaders between 50% and 10% of the width of the production web are suitable. Most desirably the strip cut from the production web is substantially the same width as the leader.

A previously produced reel of film is most conveniently used as the leader.

The invention includes a film production line for carrying out the method described above in which there is positioned between the formation section and the wind-up section:

a. a feeder for supplying the leader to the wind-up section,
b. cutters for severing the leader and the production web, and
c. a splicer for joining the leader to the production web.

Preferably the line also comprises a transfer nip which is indexable to a position above a dump nip whereby the web may be transferred to dump by gripping it in the transfer nip and thereafter indexing the transfer nip to a position above the dump nip. It is particularly desirable for each position of the transfer nip to be independently indexable; this keeps the path of the production web clear of the path of the leader during manual threading.

Two forms of splicer are particularly suitable. The first form of splicer comprises a roller with heatable needles. Using this form of splicer the leader is joined to the production web by heating the needles and piercing both webs with the hot needles. The second form of splicer comprises disengageable nip rollers for pressing the running leader to the running production web when a join is to be formed and an injector for depositing adhesive, e.g. a hot melt adhesive or an adhesive tape, into the nip of the rolls. Using this second form of splicer it is particularly convenient for the same nip to serve as splicer nip and as the transfer nip described above.

Figure 2:
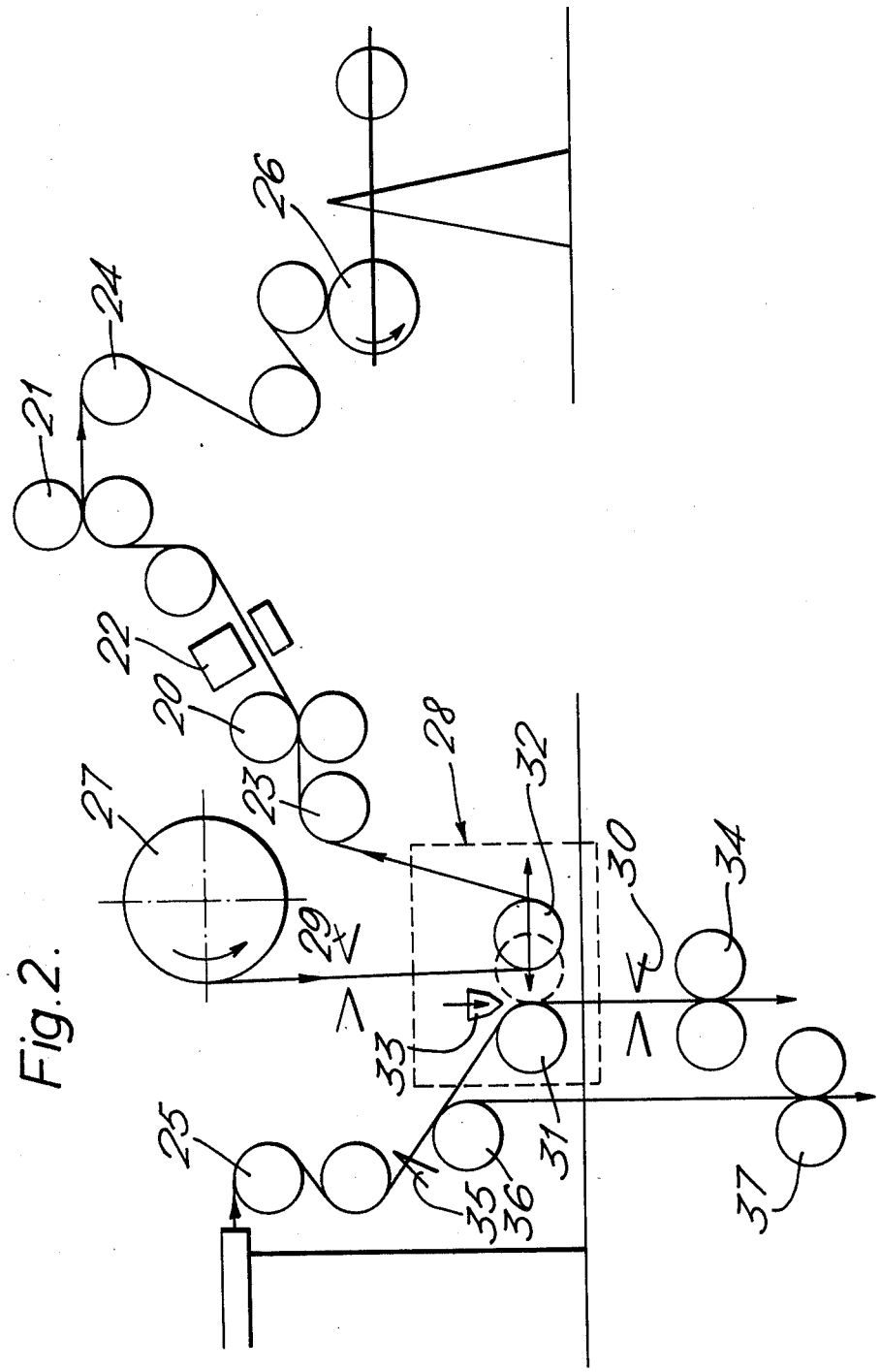
Figure 3:
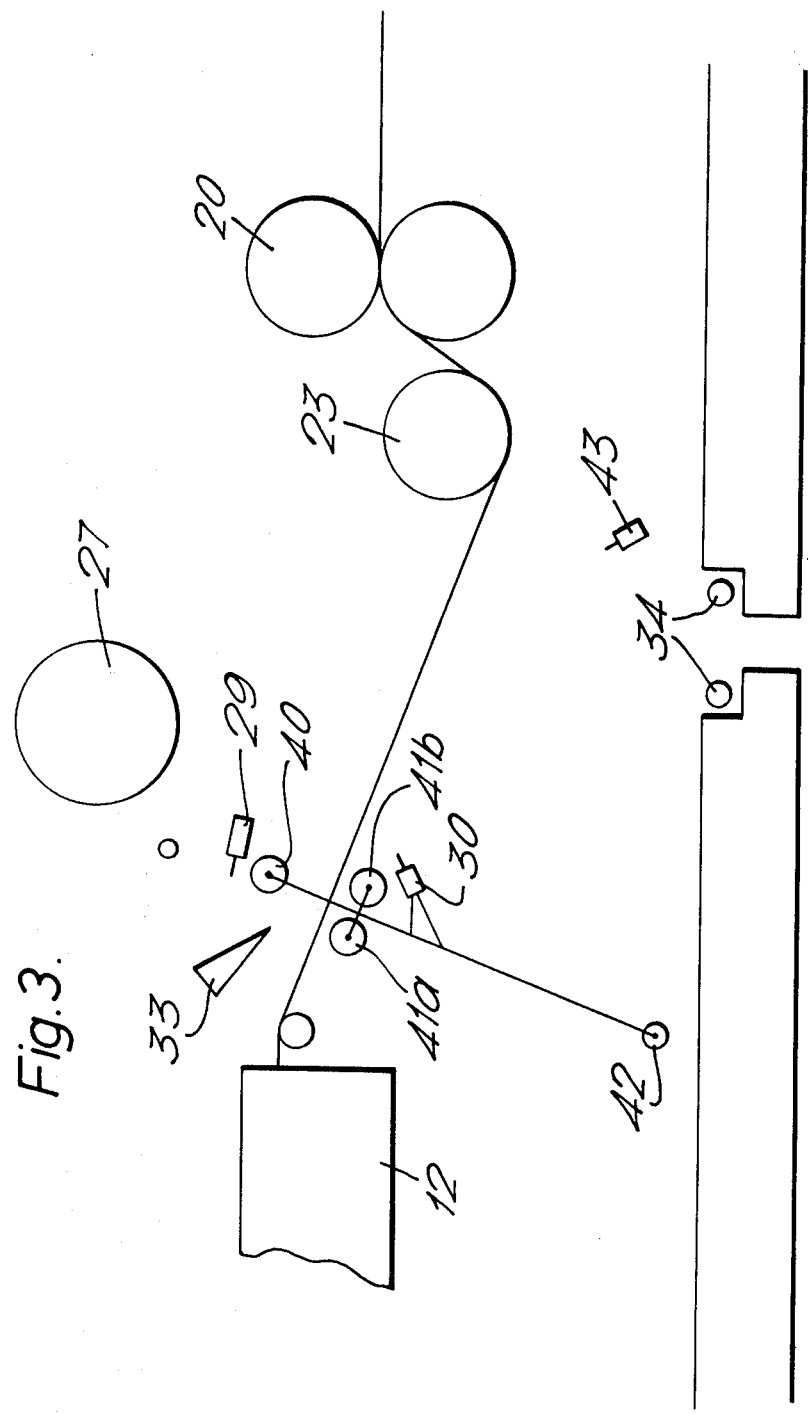
Figure 4:
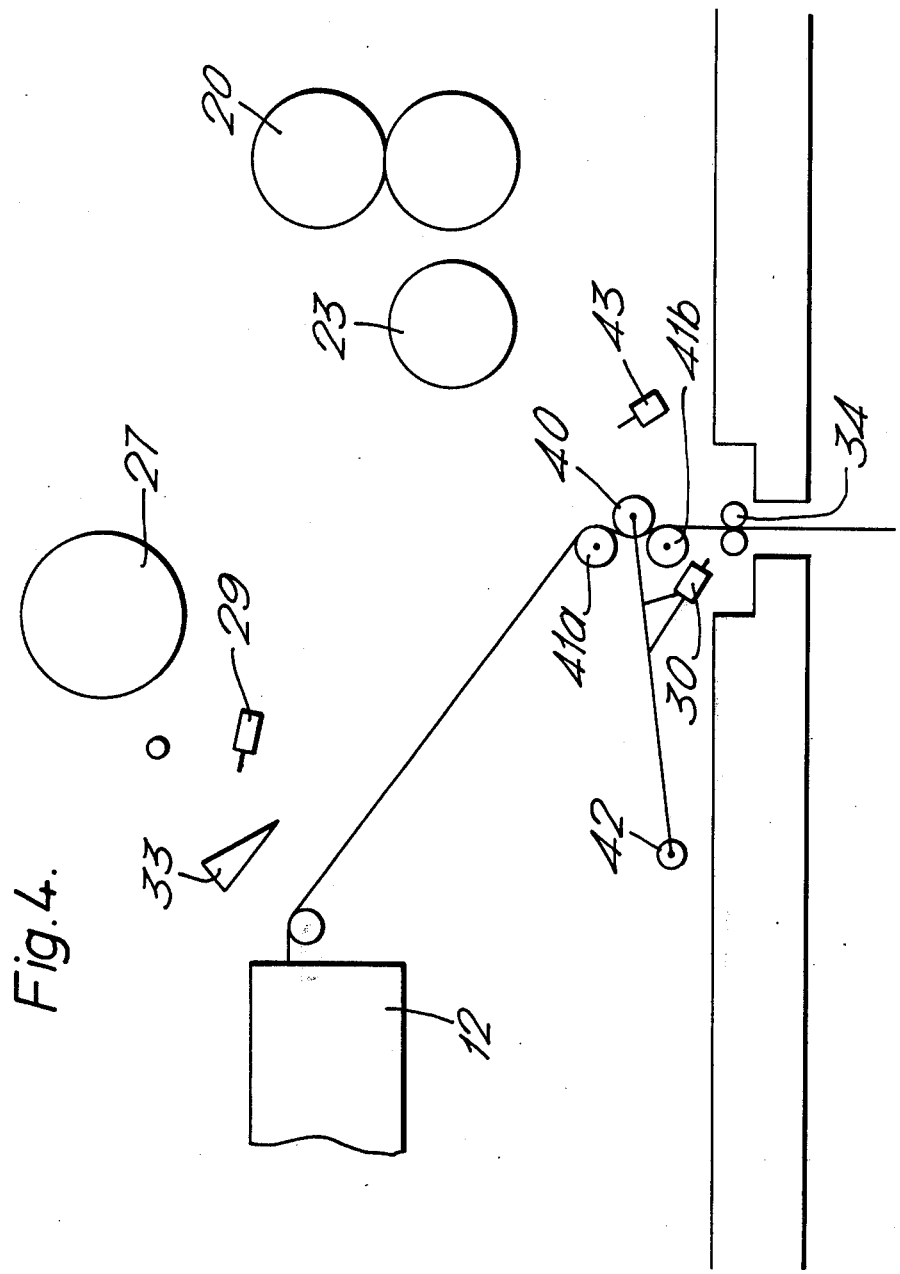
Figure 5:
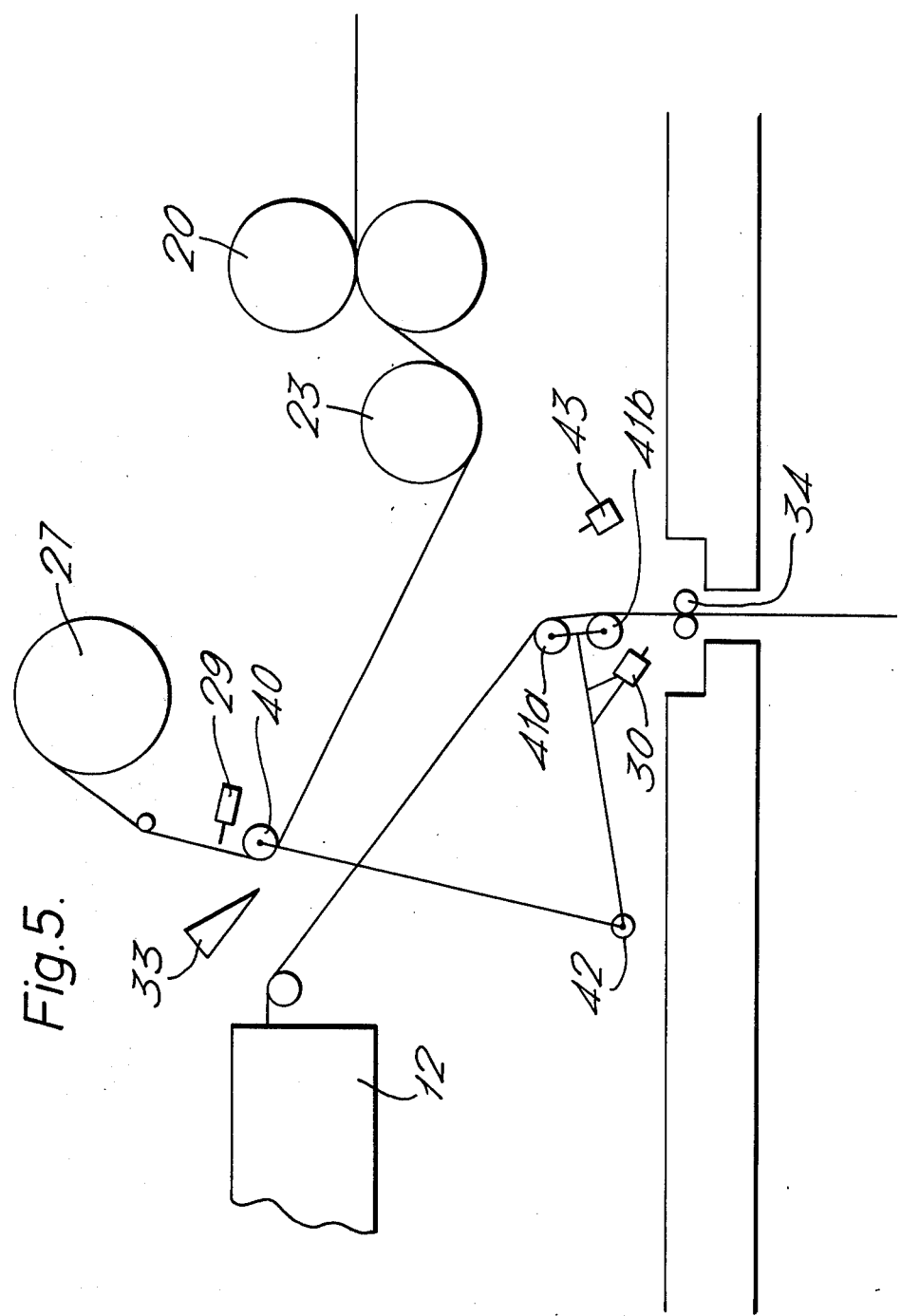
Figure 6:
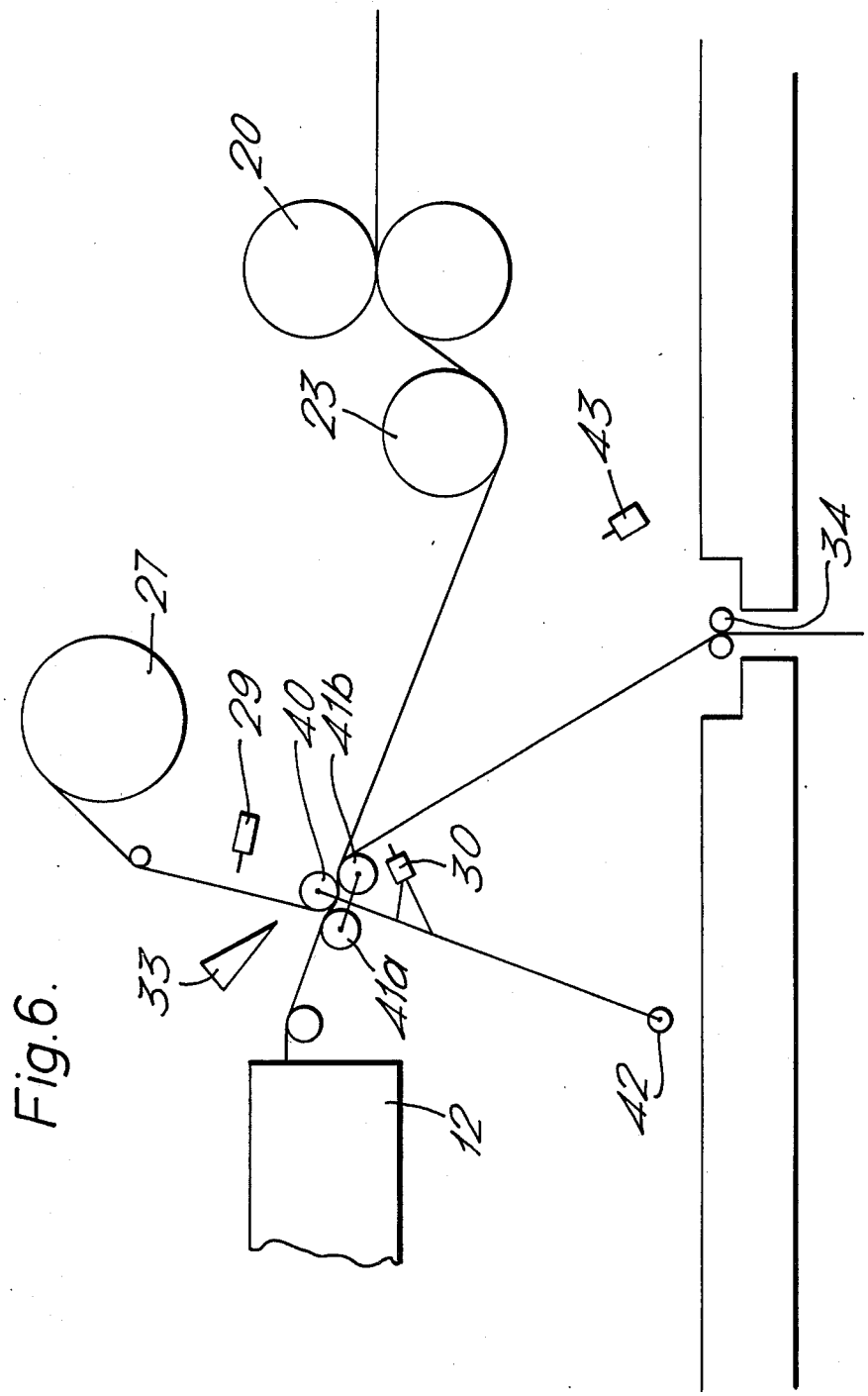
Figure 9:
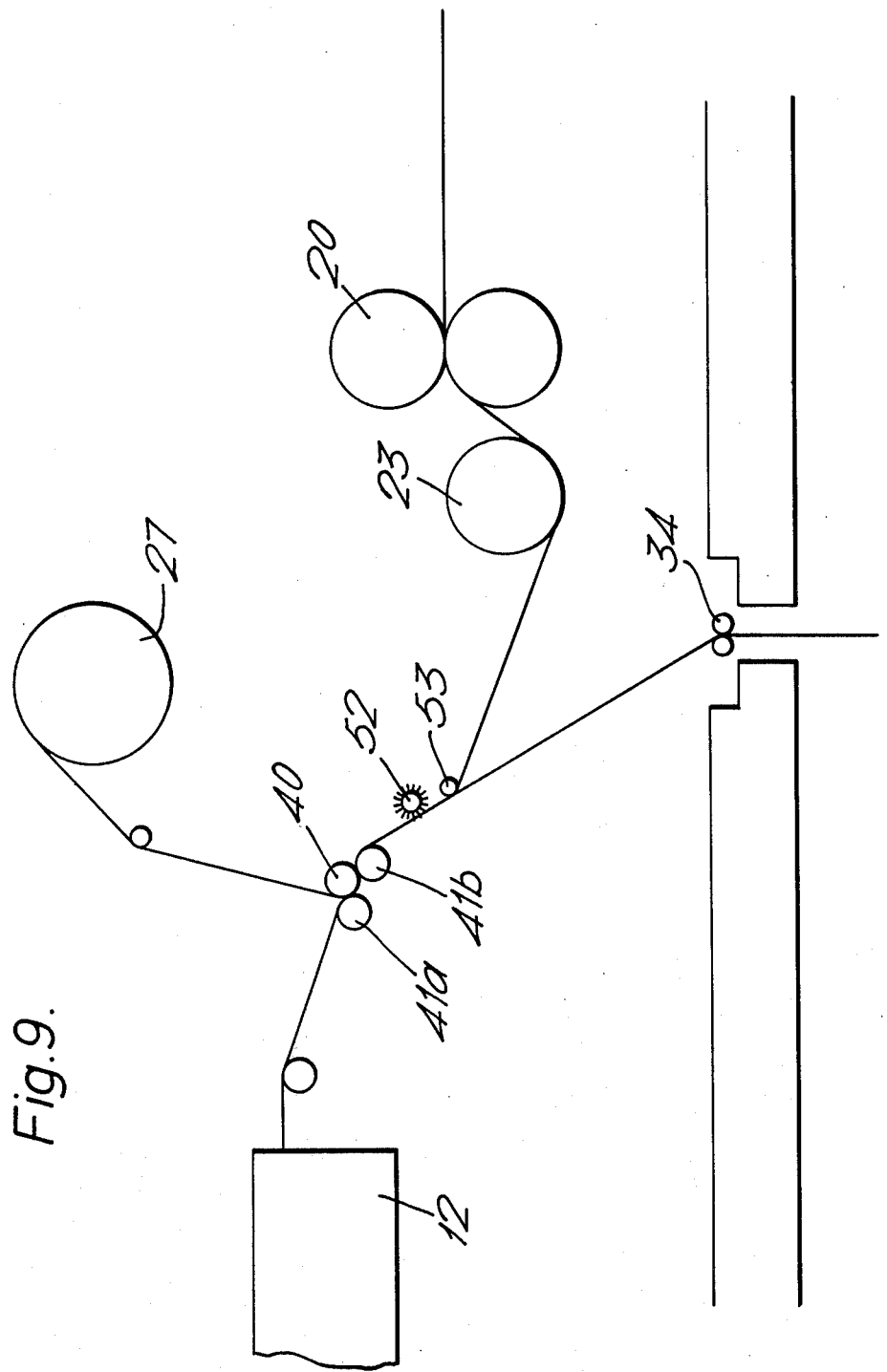

The invention will now be described by way of example with reference to the accompanying drawings in which:

FIG. 1 is a diagram of a film production line according to the invention,
FIG. 2 is a more detailed diagram of the threader and wind-up section of the line shown in FIG. 1,
FIG. 3 is a modified version of FIG. 2 showing a splicer/dumper.
FIGS. 4, 5 and 6 illustrate different phases in the operation of the splicer/dumper shown in FIG. 3,
FIGS. 7 and 8 illustrate the use of a part width leader, and FIG. 9 illustrates one method of joining the leader and the production web.

The line illustrated in FIG. 1 is a conventional film extrusion line with the addition of a threading unit according to the invention. In accordance with established practice the formation section of the line comprises an extrusion/casting unit 10, forward draw unit 11 and a sideways draw heat setting unit (stenter) 12. The film produced by the formation section is formed into reels in the wind-up section 13. In accordance with the invention the line also comprises a threader unit 14 situated between the stenter 12 and the wind-up section 13.

While the line is in normal operation the threader 14 is idle and the line operates conventionally. However occasional faults occur, for example the web may split in the sideways draw unit 12. Wherever the split occurs the sideways draw usually causes it to spread lengthwise and often the web will degenerate into two bundles which collect at the sides that nothing passes into the wind-up section 13. Even if the web does not come out of the wind-up section it is usually simpler or necessary to remove it in order to re-establish normal operation.

Since changing the speed of the formation section requires complicated adjustments it is best to keep the speed unchanged during re-adjustment. Thus it becomes necessary to re-thread the wind-up section while the line operates at full speed and this will be described with reference to FIG. 2 (which illustrates the threader 14 and the wind-up section 13 in greater detail than FIG. 1).

As shown in FIG. 2 the (conventional) wind-up section comprises nip rolls 20 and 21, profile gauge 22 and tension sensing rolls 23 and 24. The tension roll 23 controls the nip rolls 20 to maintain suitable tension at the end of the formation section (the end of the stenter is represented by the rolls 25). The tension roll 24 controls the nip rolls 21 to maintain the correct tension at the reeler 26.

The threader comprises a feeder 27 which normally holds a reel of leader (a poor quality reel previously wound on the unit is convenient for use as the leader), a splicer (generally indicated by the numeral 28), leader cutter 29 and waste web cutter 30. The splicer 28 is formed of nip rolls 31 and 32 (shown in the disengaged position by the continuous lines) together with a nozzle 33 for the application of adhesive to the production web.

During normal operation (when the threader is idle) the production web passes between the disengaged splicer nip rolls 31 and 32 and thence into the wind-up section. When there is a fault the line is prepared for resumption of production as follows.

The formation section is brought back to normal and the production web is arranged to pass first between the splicer nip rolls 31 and 32 and second through a dump nip 34 to waste. The wind-up section is stopped and the leader is (manually) unwound from its feeder 27, passed between the splicer nip rolls 31 and 32 and then it is threaded through the wind-up section and attached to a spool on the reeler 26. At this stage the line is in the condition illustrated in FIG. 2 and it is ready to initiate the automatic threading sequence.

First the wind-up section is run up to speed and, when the speeds match, the nip roll 32 moves horizontally so that the leader and the production web are pressed together. As soon as the pressure is applied the nozzle 33 deposits a line of adhesive onto the nip between the rolls 31 and 32. Cutter 30 operates to sever the production web from the dump so that the end of the production web is secured to the end of the feeder and therefore the production web is drawn through the wind-up section. When the production web reaches the reeler 26, the cutter 29 frees the leader from its feeder 27 (which is braked to a standstill).

(It is suggested that edge trim is carried out before the wind-up section. As shown in FIG. 2 the edge trim blade 35 are positioned after the rolls 25. The edge trim is removed via guide rolls 36 and nip 37.)

A modified line, in which the splicer also acts as a transfer nip, as illustrated in FIG. 3. The important difference between this line and the one shown in FIG. 2 is that the transfer/splicer nip, formed of a single rubber roll 40 on one side and a double steel roll 41a, 41b on the other side, can index about the centre 42 so that it can take a position above the dump nip 34. The frame carrying the single roll 40 is arranged outside that of the double roll 41a, 41b so that the two parts of the splicer nip can index independently; i.e., the inner frame can pass through the outer.

The leader cutter 29 and the nozzle for adhesive 33 are positioned as shown in FIG. 2. The waste web cutter 30 is supported on the frame carrying the double roll 41a, 41b so that it indexes with them. In addition there is a dump cutter 43 positioned near the dump nip 34. When a fault is detected the single roll 40 closes onto the double roll 41a, 41b to grip the production web. The closed transfer/splicer nip indexes round to a position just above the dump nip 34, the web is cut by the dump cutter 43 and the free end falls through the dump nip 34 which closes. This gives the situation shown in FIG. 4. (Up to this stage the transfer/splicer nip has been performing its transfer function).

The dump nip now holds the web so that the splicer nip can open and the single roll 40 can return to its normal position as shown in FIG. 5. The separation of the two parts of the splicer nip facilitates threading the leader as described above.

Finally the double roll 41a, 41b returns to its original position and the threading sequence starts (and the transfer/splicer nip begins its "splicer" function). The wind-up section is run up to speed, the single roll 40 closes to engage the double roll 41a, 41b and grip both webs as shown in FIG. 6. The nozzle 33 begins to apply adhesive into the nip where the double roll 41a, 41b gives a large area of contact so that good adhesion is achieved. When the adhesive reaches the nip, cutter 30 severs the waste web and the production web is taken through the wind-up section by the leader. When the production web reaches the wind-up reel the application of adhesive stops and the leader is severed by the cutter 29. A new wind-up reel is started when the leader has cleared the wind-up section.

The modified form of the invention illustrated in FIGS. 7 and 8 uses a leader which is only 20% of the full width of the web. Most of the apparatus is similar to that already described and this example will describe the differences.

FIG. 7 shows the position at the start of the threading sequence in which a satisfactory production web passes to dump. Edge trim, which is cut by knives 50, is established before the threading sequence commences. The modified apparatus includes a pair of retractable knives 51 which can move across the width of the web. The knives 51 are arranged to move so that the centre of the web is half-way between them. In the retracted position the knives do not engage with the web. In the extended position they cut slits in the web.

To initiate the threading process the knives are extended so that they cut two slits, each 10% of the width of the web from the centre of the web. This gives a centre strip representing 20% of the web and two marginal strips can representing 40% of the web. The centre strip is cut and joined to a leader as described with reference to FIGS. 3, 4, 5 and 6. The leader is 20% of the width of the web.

Once the centre strip has passed through the windup unit the knives 51 move outwards so that the centre strip becomes wider and the marginal strips narrower until all the web becomes centre strip. When the full-width strip reaches the reeler 26, a reel change starts normal working.

In this embodiment the leader is only 20% of the width of the web. Thus the equipment needed to handle the leader, e.g. the feeder 27, is much less massive which facilitates operation.

A further modification, shown in FIG. 9, uses a different way of joining the centre strip to the leader.

FIG. 9 is similar to FIG. 6; the important difference is that the injector 33 is replaced by roller 52 and follower 53 just downstream of the transfer nip, i.e., rollers 40, 41a and 41b. Roller 52 has needles which are heated prior to and during the joining process.

When the leader and the centre strip are brought together for joining the hot needles pierce both layers. Each needle carries some material through the two webs which become joined togther at the place of the puncture. (This method of joining two webs is described in our U.K. patent specification 1,306,286).

The method of joining just described has weak peel-strength combined with a relatively high tangential strength, i.e., in the plane of the laminate. Thus the joining of the leader and the production web can be started before the production web is cut. The webs are easily separated (so that the production web can go to dump and the leader to wind-up) because of the low peel-strength. However the tangential strength is high enough for the leader to take the production web through the wind-up unit. Perforation should be continued until the production web reaches the reeler 26 (when the leader is cut as described previously).

In all the embodiments described, the manual threading of the leader is carried out while the wind-up section is stopped. This is a simple operation. The threading of the production web is carried out at the normal speed of the line by means of a simple automatic operation. This is an advantage especially in the case of high speed units in which the normal speed of the web is too high for manual threading. The automatic threading can be used both on start up and after a malfunction.

We claim:

1. A method of threading a thermoplastic film, issuing from a web-formation section of a production line, through a wind-up section when the production line is re-started after a stoppage or after the wind-up section has become unthreaded due to a malfunction in the web formation section, said method comprising:
   a. running the formation section and feeding the moving production web to waste while simultaneously threading a leader through the wind-up section while the latter is stopped,
   b. starting the wind-up section so as to begin winding up the leader and matching the speed of the wind-up section to that of the formation section, and
   c. then joining the moving leader to the moving production web at a location upstream of the windup section so that the production web is threaded through the wind-up section by the leader.

2. A method according to claim 1, in which stage (c) is carried out in the following order:
   i. joining the leader to the production web,
   ii. severing the production web from waste and severing the leader from its feed.

3. A method according to claim 1 in which the leader is severed from its feed after the production web is threaded through the whole of the wind-up section.

4. A method according to claim 1, in which the leader is less than 50% of the width of the production web and said leader is attached to a strip cut from the production web.

5. A method as in claim 1 including severing the moving production web from waste at a location downstream from the joining location, after the joining step has been completed.

* * * * *